United States Patent
Choi (10) Patent No.: US 12,372,072 B2
(45) Date of Patent: Jul. 29, 2025

(54) ROTATIONAL FORCE AMPLIFIER

(71) Applicant: Hyo Keun Choi, Gyeonggi-do (KR)

(72) Inventor: Hyo Keun Choi, Gyeonggi-do (KR)

(*) Notice: Subject to any disclaimer, the term of this patent is extended or adjusted under 35 U.S.C. 154(b) by 883 days.

(21) Appl. No.: 17/624,047

(22) PCT Filed: Jul. 2, 2020

(86) PCT No.: PCT/KR2020/008636
§ 371 (c)(1),
(2) Date: Dec. 30, 2021

(87) PCT Pub. No.: WO2021/006537
PCT Pub. Date: Jan. 14, 2021

(65) Prior Publication Data
US 2022/0397105 A1    Dec. 15, 2022

(30) Foreign Application Priority Data

Jul. 5, 2019  (KR) .................. 10-2019-0081541
Jan. 17, 2020 (KR) .................. 10-2020-0006842

(51) Int. Cl.
*H02K 7/18* (2006.01)
*F03G 7/08* (2006.01)
*F03G 7/10* (2006.01)

(52) U.S. Cl.
CPC .............. *F03G 7/119* (2021.08); *F03G 7/08* (2013.01); *H02K 7/1807* (2013.01)

(58) Field of Classification Search
CPC .......... H02K 7/1807; H02K 7/20; H02K 7/02; H02K 7/116; F03G 7/119; F03G 7/08; F03G 3/08
See application file for complete search history.

(56) References Cited

U.S. PATENT DOCUMENTS 8,327,728 B2 * 12/2012 Carlson .................. G01C 19/06
74/5.37

FOREIGN PATENT DOCUMENTS

KR      10-0404975 B1    11/2003
KR    20-2006-0000045 U   11/2006
(Continued)

OTHER PUBLICATIONS

International Search Report for PCT/KR2020/008636 mailed on Oct. 12, 2020.

*Primary Examiner* — Emily P Pham
(74) *Attorney, Agent, or Firm* — The PL Law Group, PLLC (57) ABSTRACT

A torque amplification device for amplifying torque of a power transmission shaft and transmitting the amplified torque to a driven shaft according to an embodiment includes one or more eccentric amplification parts including a first rotation part, to the center portion of which a shaft in the power transmission shaft direction is connected and which is eccentrically connected to a shaft facing the driven shaft in a driven shaft direction; and an output end amplification part which is connected to the eccentric amplification part through a rotary shaft in the power transmission shaft direction, includes a second rotation part connected to the outside of the rotary shaft, and transmits the torque of the rotary shaft, transmitted from the eccentric amplification part, to one side of the second rotation part so as to drive same, thereby transmitting the torque of the second rotation part in the driven shaft direction.

8 Claims, 6 Drawing Sheets

(56) References Cited

FOREIGN PATENT DOCUMENTS

| KR | 10-2010-0003841 A | 1/2010 |
| KR | 10-2014-0135016 A | 11/2014 |
| KR | 10-2014-0135329 A | 11/2014 |
| KR | 10-2019-0053139 A | 5/2019 |

* cited by examiner

ROTATIONAL FORCE AMPLIFIER

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/008636, filed Jul. 2, 2020, which claims priority to the benefit of Korean Patent Application No. 10-2019-0181541 filed in the Korean Intellectual Property Office on Jul. 5, 2019, and the benefit of Korean Patent Application No. 10-2020-0006842 filed in the Korean Intellectual Property Office on Jan. 17, 2020 the entire contents of which are incorporated herein by reference.

BACKGROUND

1. Technical Field

The present invention relates to a device for transmitting a rotational force transmitted from a driving motor to an external apparatus, and more specifically, to a rotational force amplifier for amplifying a rotational force using an eccentric lever principle and transmitting the amplified rotational force.

2. Background Art

Generally, since a rotational force of a low-power motor has a limited set torque value of an input shaft, it is difficult to change a torque value of an output shaft. The conventional power amplification method of changing a torque value is mainly a method of amplifying a rotation torque using a reducer. In this case, a large rotational driving force may be obtained using the reducer, but there is a disadvantage in that a rotational speed is lowered. A rotational force amplifier using a lever other than a reducer has been disclosed. As disclosed in the related art, which is Korean Patent Publication No. 10-0404975, "DEVICE FOR TRANSMITTING TORQUE AND REGULATING ROTATING VELOCITY" (registered on Oct. 29, 2003), there is an advantage in that, when an input gear engaged with an indirect crank shaft is rotated using a low-power motor, a rotational driving force increased according to a ratio of a rear crank, to which a rotational motion is transmitted according to a link ratio of a lever principle, is output to an indirect crank, and a stable rotational driving force may be obtained through a plurality of lever links.

In the related arts using the lever principle, an output of a rotational driving force is changed according to a length of a lever, but there is a disadvantage in that an energy transmission distance through the lever increases.

SUMMARY

The present invention is directed to providing a rotational force amplifier which operates in a high efficiency manner and has an improved structure including an eccentric shaft to efficiently amplify a rotational driving force output from a low-power motor using a lever principle.

One aspect of the present invention provides a rotational force amplifier which amplifies a rotational force of a power transmission shaft and transmits the amplified rotational force to a driven shaft, the rotational force amplifier including one or more eccentric amplification units each having a first rotation unit in which a shaft disposed in a power transmission shaft direction is connected to a central portion of the first rotation unit and which is eccentrically connected to a shaft disposed toward the driven shaft in a driven shaft direction, and an output terminal amplification unit which includes a second rotation unit connected to the eccentric amplification unit through the rotating shaft in the power transmission shaft direction and coupled to an outer side of the rotating shaft, transmits a rotational force, which is transmitted from the eccentric amplification unit, of the rotating shaft to one side of the second rotation unit, and drives the second rotation unit to transmit the amplified rotational force of the second rotation unit in the driven shaft direction.

According to an embodiment, the eccentric amplification unit may include the first rotation unit in which the shaft disposed in the power transmission shaft direction is connected to the central portion of the first rotation unit, an eccentric shaft which is attached to the first rotation unit at a position away from a center by a predetermined distance and is eccentrically connected in the driven shaft direction, a wing pendulum which is connected to one side opposite to the one side of the first rotation unit and balances weights of both sides of the first rotation unit, and a self-aligning ball bearing connected to the eccentric shaft in the power transmission shaft direction and connected in the driven shaft direction through a second rotating shaft.

In addition, when the number of the eccentric amplification units is two or more, a direction, in which the eccentric shaft of at least one of the two or more eccentric amplification units is eccentric, may be opposite to a direction in which the eccentric shaft of the remaining eccentric amplification unit is eccentric.

In addition, the output terminal amplification unit may further include the second rotating shaft disposed in the power transmission shaft direction, the resistance connecting part which is connected to the second rotating shaft and receives the rotational force, the second rotation unit of which one wing of two wings is coupled to the resistance connecting part, an output terminal wing pendulum formed on the remaining wing that is different from the one wing of the second rotation unit, a resistance shaft formed along the second rotating shaft to be bent in a "c" shape in a direction opposite to a direction of the one wing, and a weight pendulum formed in a direction opposite to a direction in which the resistance shaft is bent.

Another aspect of the present invention provides a rotational force amplifier which amplifies a rotational force of a power transmission shaft and transmits the amplified rotational force to a driven shaft, the rotational force amplifier including one or more eccentric amplification units each having a first rotation unit in which a first rotating shaft disposed in a power transmission shaft direction is connected to a central portion of the first rotation unit and which is connected to a second rotating shaft disposed toward the driven shaft in a driven shaft direction, and a horizontal rotating device which is connected to the eccentric amplification unit through the second rotating shaft, rotates two wings in a horizontal direction using a rotational force transmitted through the second rotating shaft to amplify the rotational force parallel to a ground surface, and transmits the amplified rotational force to an output terminal.

According to an embodiment, the horizontal rotating device may include a helical gear unit connected to the eccentric amplification unit through the second rotating shaft and coupled to an outer side of the second rotating shaft to be rotated in conjunction with the second rotating shaft, a horizontal resistance connecting part which is connected to the helical gear unit through a shaft and receives a rotational force of the helical gear unit to be rotated, and a horizontal rotation unit including two wings which have one wing connected to the horizontal resistance connecting part and are rotated according to rotation of the horizontal resistance connecting part.

Still another aspect of the present invention provides a rotational force amplification system which amplifies a rotational force supplied by a driving motor and outputs the amplified rotational force to an output terminal using the rotational force amplifier according to an embodiment.

In this case, the rotational force amplifier may be sequentially provided as a plurality of rotational force amplifiers, and the rotational force amplification system may further include a connecting device which is interposed between the plurality of rotational force amplifiers and transmits a rotational force amplified by a foremost rotational force amplifier to a rearmost rotational force amplifier.

The connecting device may include a rotating shaft which concentrically rotates with the driving motor and the output terminal, a first resistance shaft which is eccentrically formed on a front end of the rotating shaft to be bent from the rotating shaft, a first bearing and a second bearing concentrically formed around the rotating shaft, and a second resistance shaft eccentrically formed on a rear end of the rotating shaft to be bent from the rotating shaft in a direction opposite to that of the first resistance shaft.

The rotational force amplification system according to an embodiment may further include a connecting device which is positioned on a rear end of the rearmost rotational force amplifier and transmits a rotational force amplified by the rearmost rotational force amplifier to the output terminal.

According to an embodiment of the present invention, since an increased rotational driving force output from a driving motor can be efficiently amplified and transmitted using an eccentric shaft and a lever principle, and the amplified rotational driving force can be transmitted to an external driving apparatus, the rotational force can be efficiently transmitted.

DETAILED DESCRIPTION

Hereinafter, detailed descriptions of exemplary embodiments of the present invention will be given with reference to the accompanying drawings. It should be noted that the same numerals are assigned to the same components in different drawings whenever possible. Detailed specific features are provided in the following description, but these are provided to facilitate overall understanding of the present invention. Also, in description of the present invention, when it is determined that detailed descriptions of related well-known functions or configurations may unnecessarily obscure the gist of the present invention, detailed descriptions thereof will be omitted.

The terms used herein will be briefly described and the present invention will be described in detail.

Although the terms used herein are selected from among general terms that are currently and widely used in consideration of functions in the embodiments of the present invention, these may be changed according to intentions of those skilled in the art, precedents, or the advent of new technology. In addition, in a specific case, some terms may be arbitrary selected by applicants. In this case, meanings thereof will be described in detail in a corresponding description of the embodiments of the present invention. Therefore, the terms used herein should be defined based on meanings of the terms and content of this entire specification, rather than simply the terms themselves.

Throughout the specification, when a portion "includes" an element, another element may be further included, rather than excluding the existence of the other element, unless otherwise described. Moreover, terms described in the specification, such as " . . . part" and "module," refer to a unit of processing at least one function or operation and may be implemented by hardware or software or a combination thereof.

As a reference, in the description of the present invention, a direction toward a driving motor is a "power transmission shaft direction," and a direction, in which a force is transmitted to the outside (output terminal), is a "driven shaft direction."

A rotational force amplifier 1 according to an embodiment of the present invention includes one or more eccentric amplification units 2 each having a first rotation unit, of which a shaft disposed in the power transmission shaft direction is connected to a central portion thereof and which is eccentrically connected to a shaft toward a driven shaft in the driven shaft direction, and an output terminal amplification unit 3 which includes a second rotation unit connected to the eccentric amplification unit through the shaft in the power transmission shaft direction and coupled to an outer side of the shaft, transmits a rotational force, which is transmitted from the eccentric amplification unit, of the shaft to one side of the second rotation unit 30, and drives the second rotation unit 30 to transmit a rotational force of the second rotation unit 30 in the driven shaft direction.

Figure 1:
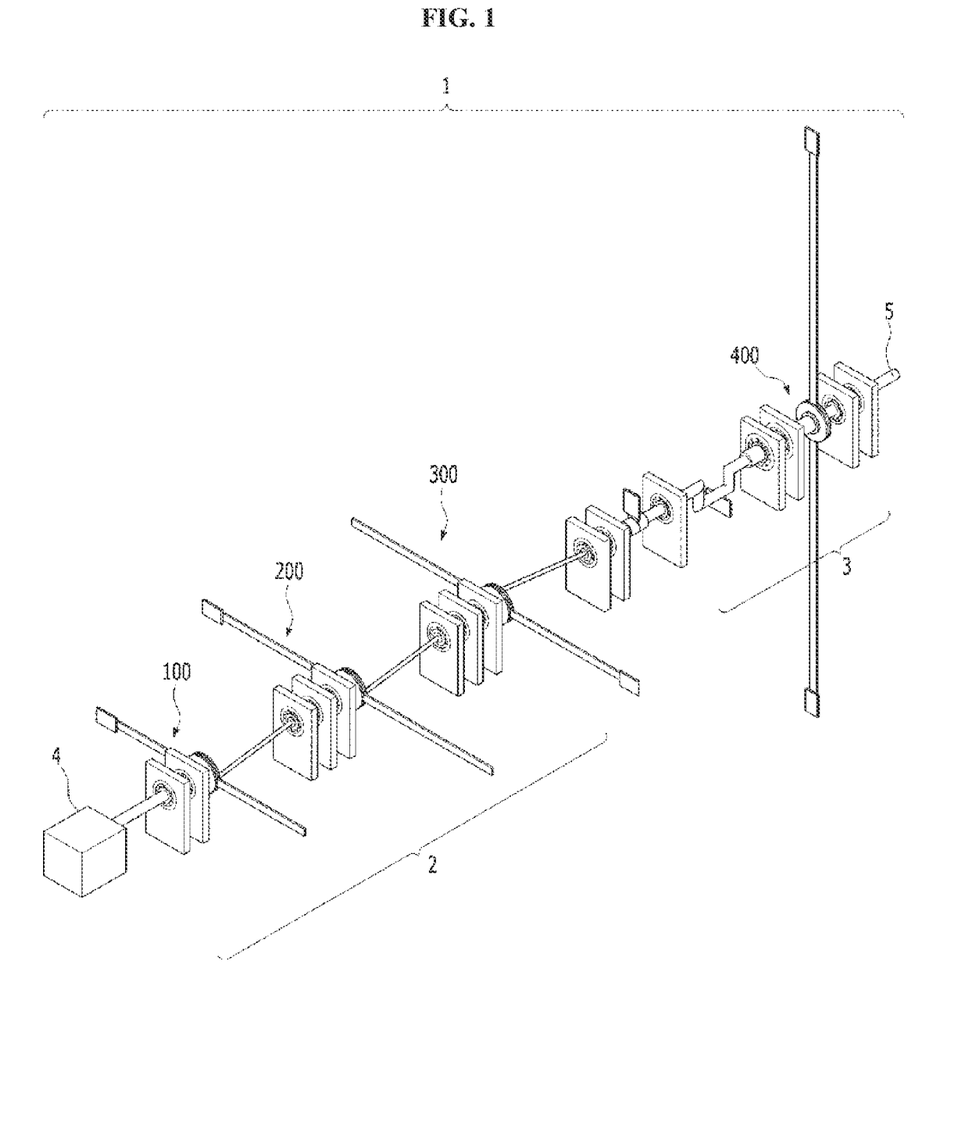
FIG. 1 is a perspective view illustrating a rotational force amplifier according to an embodiment of the present invention.

Referring to FIG. 1, in the rotational force amplifier 1 according to an embodiment, a rotational driving force transmitted from the driving motor 4 is transmitted to the outside through three eccentric amplification units 2 and one output terminal amplification unit 400.

However, the number of the eccentric amplification units 2 according to an embodiment of the present invention is not limited to three, and in the rotational force amplifier 1 according to an embodiment, a plurality of eccentric amplification units 2 may be sequentially provided. When two or more eccentric amplification units 2 are provided, a direction, in which a rotation unit is eccentric, of at least one of two or more eccentric amplification units 2 may be opposite to that of the other eccentric amplification unit. Most preferably, as illustrated in FIG. 1, a direction, in which a first eccentric amplification unit 100 is eccentric, is the same as a direction, in which a second eccentric amplification unit 200 is eccentric, and is opposite to a direction in which a third eccentric amplification unit 300 is eccentric.

Referring to FIG. 1, a rotational force generated when the driving motor 4 is driven is gradually amplified by the first eccentric amplification unit 100, the second eccentric amplification unit 200, and the third eccentric amplification unit 300, is further amplified by the output terminal amplification unit 3, and is transmitted to an output terminal 5.

In the rotational force amplifier 1 according to an embodiment, each of the rotation units having wings may be covered with an air resistance cover to reduce friction with air in order to improve performance.

Figure 2:
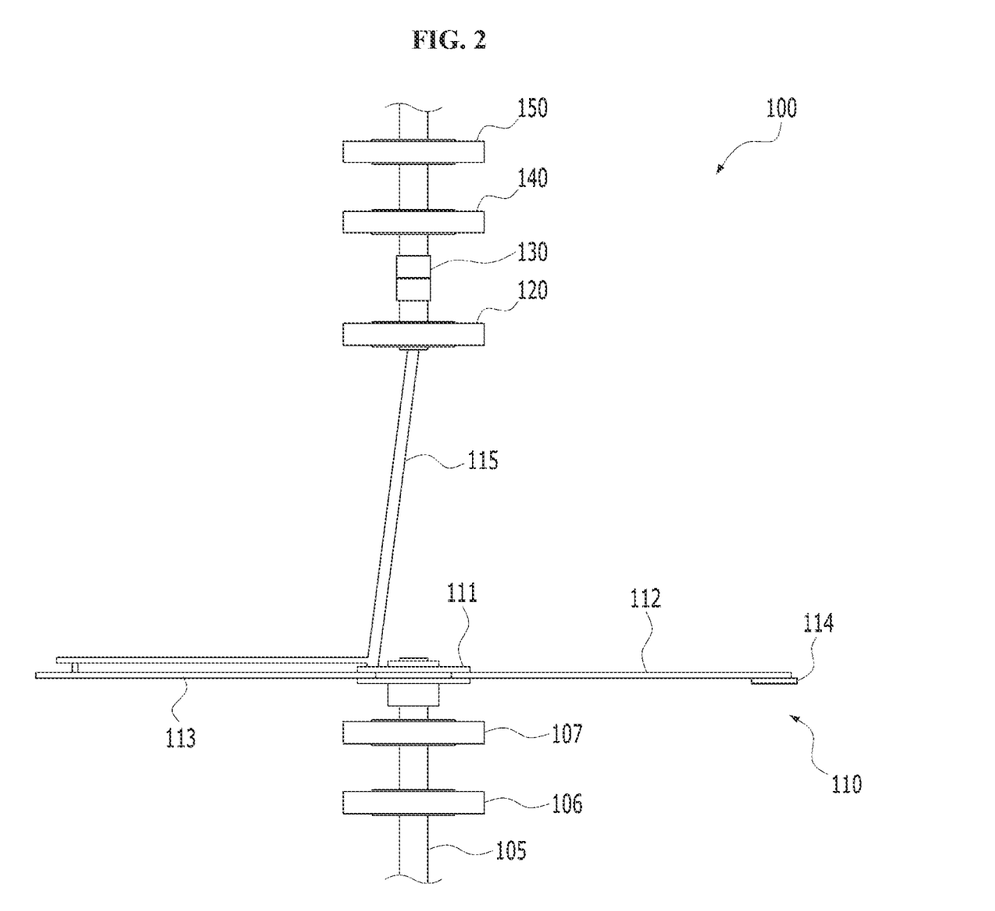
FIG. 2 is an enlarged plan view illustrating a main part of the rotational force amplifier according to an embodiment of the present invention.

Referring to FIG. 2, the first eccentric amplification unit 100 includes a first rotation unit 110 in which a first rotating shaft 105 disposed in the power transmission shaft direction is attached to a central portion thereof, an eccentric shaft 115 which is attached at a point away from a center of the first rotation unit 110 by a predetermined distance, eccentrically connected to the first rotation unit 110 in the driven shaft direction, is eccentric in the driven shaft direction, and has an "L" shape, a wing pendulum 114 which is connected to a wing 112 opposite to one wing 113 connected to the eccentric shaft 115 and balances weights of both sides of the first rotation unit 110, and a self-aligning ball bearing 120 connected to the eccentric shaft 115 in the driven shaft direction. In this case, the first rotating shaft 105 and the second rotating shaft 130 rotate concentrically with the driving motor and the output terminal. The amplified rotational force is transmitted to the second rotating shaft 130 through the self-aligning ball bearing 120.

Referring to FIG. 2, a protruding part of the eccentric shaft 115 is fitted to a hole at the position away from the center of the first rotation unit 110 by the predetermined distance, and the eccentric shaft 115 is connected to an outer side of one wing 113 of the first rotation unit 110 via a general connecting member such as a bolt.

In this case, when the first rotating shaft 105 disposed in the power transmission shaft direction rotates to rotate the first rotation unit 110, the eccentric shaft 115 is eccentrically rotated along with the first rotation unit 110, and a rotational force is amplified, and the amplified rotational force may be transmitted to the second rotating shaft 130 disposed in the driven shaft direction. In this case, the self-aligning ball bearing 120 supports the eccentric shaft 115 eccentrically connected to the first rotation unit 110 in the driven shaft direction and allows the eccentric shaft 115 to be rotated.

In this case, a pair of general bearings 106 and 107 for supporting the rotation of the first rotating shaft 105 disposed in the power transmission shaft direction may be used. In addition, the second rotating shaft 130, which is disposed in the driven shaft direction and connected to the eccentric shaft 115 through the self-aligning ball bearing 120, may be supported by a pair of general bearings 140 and 150.

As illustrated in FIG. 1, when the plurality of eccentric amplification units, such as the first eccentric amplification unit 100, the second eccentric amplification unit 200, and the third eccentric amplification unit 300, are sequentially connected, eccentric rotation is repeated several times so that the rotational force may be additionally amplified.

As illustrated in FIG. 2, the first rotation unit 110 may include two wings 112 and 113. In this case, since a large pressure is applied to the first rotation unit 110 due to rotation, a material of the first rotation unit may be giga steel satisfying a strength and machinability at the same time.

In addition, the wing pendulum 114 may be used to balance two wings 112 and 113 of the first rotation unit 110.

In this case, a material of the wing pendulum 114 may be a metal having a high specific gravity.

Figure 3:
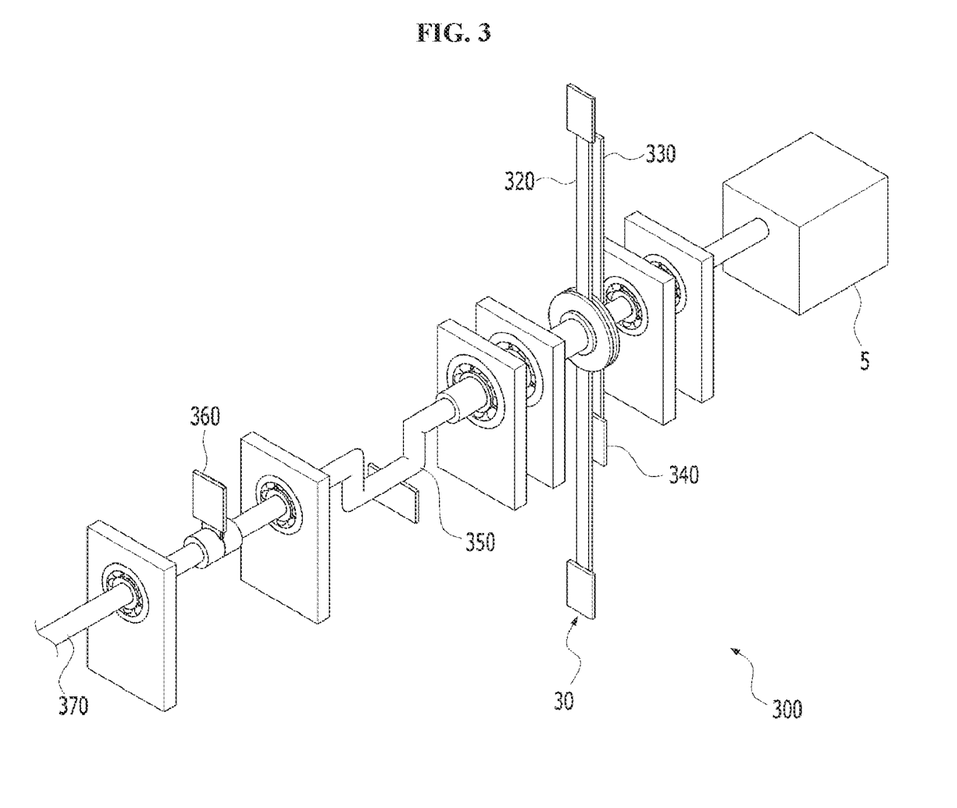
FIG. 3 is an enlarged perspective view illustrating a main part of the rotational force amplifier according to an embodiment of the present invention.

FIG. 3 is an enlarged perspective view illustrating a main part of the rotational force amplifier of the present invention.

The output terminal amplification unit according to an embodiment may include a rotating shaft 370 disposed in the power transmission shaft direction, a resistance connecting part 330 connected to the rotating shaft 370, and a second rotation unit 30 connected to the resistance connecting part 330. Referring to FIG. 3, the output terminal amplification unit 3 may include a resistance shaft 350 which is positioned to be spaced a predetermined distance from the second rotation unit 30 along the rotating shaft 370 and formed to be bent in a "⊂" shape in a direction opposite to an outer side of the one wing 320. In this case, a pendulum may be added to an end of the resistance shaft 350 to adjust weight balance.

In addition, the output terminal amplification unit 3 may include a wing pendulum 340 at each side of two wings of the second rotation unit 30 in order to balance a weight of the second rotation unit 30.

In this case, when the rotating shaft 370 disposed in the power transmission shaft direction rotates, a rotational force thereof is transmitted to and rotates the resistance connecting part 330 connected to the rotating shaft 370, and a rotational force of the resistance connecting part 330 is also transmitted to one wing 320 of two wings of the second rotation unit 30. Accordingly, the second rotation unit 30 is rotated. That is, the rotational force from the rotating shaft 370 is transmitted to only one wing 320 of two wings of the second rotation unit 30 through the resistance connecting part 330 connected to the rotating shaft 370, and accordingly, the second rotation unit 30 is rotated.

In this case, lengths of two wings of the resistance connecting part 330 may be changed, and a difference in weight between two wings according thereto may be compensated for by applying the wing pendulum 340 to an end of the short wing so that the weights of two wings may match.

Referring to FIG. 3, the output terminal amplification unit 3 further includes a weight pendulum 360 which is positioned at a predetermined distance from the resistance connecting part along the rotating shaft in the power transmission shaft direction and formed in a direction opposite to the direction in which the resistance shaft 350 is bent.

When the rotating shaft 370 rotates, the rotational force is transmitted to one wing 320 of two wings of the second rotation unit 30 through the resistance connecting part 330, and accordingly, the second rotation unit 30 is rotated. In this case, the resistance shaft 350 formed along the rotating shaft 370 to be bent in the "⊂" and the weight pendulum 360 formed in the direction opposite to the direction, in which the resistance shaft 350 is formed, facilitate rotation of the second rotation unit.

As the second rotation unit 30 having some weight is rotated, an amplified rotational driving force of the second rotation unit 30 is transmitted to the output terminal 5.

In this case, as the wing of the second rotation unit 30 becomes longer and heavier, a larger rotational driving force may be transmitted to the output terminal 5. That is, it is a principle that a force transmitted from the power transmission shaft rotates the large and heavy second rotation unit 30 so that the rotational force is transmitted to the output terminal 5.

As illustrated in FIG. 3, the second rotation unit 30 may have the wings at two sides. When the second rotation unit 30 rotates, since a high pressure is applied to the second rotation unit 30, a material of the second rotation unit 30 may be giga steel satisfying a strength and machinability at the same time. In addition, a material of the weight pendulum 360 may be a metal having a high specific gravity.

Figure 4:
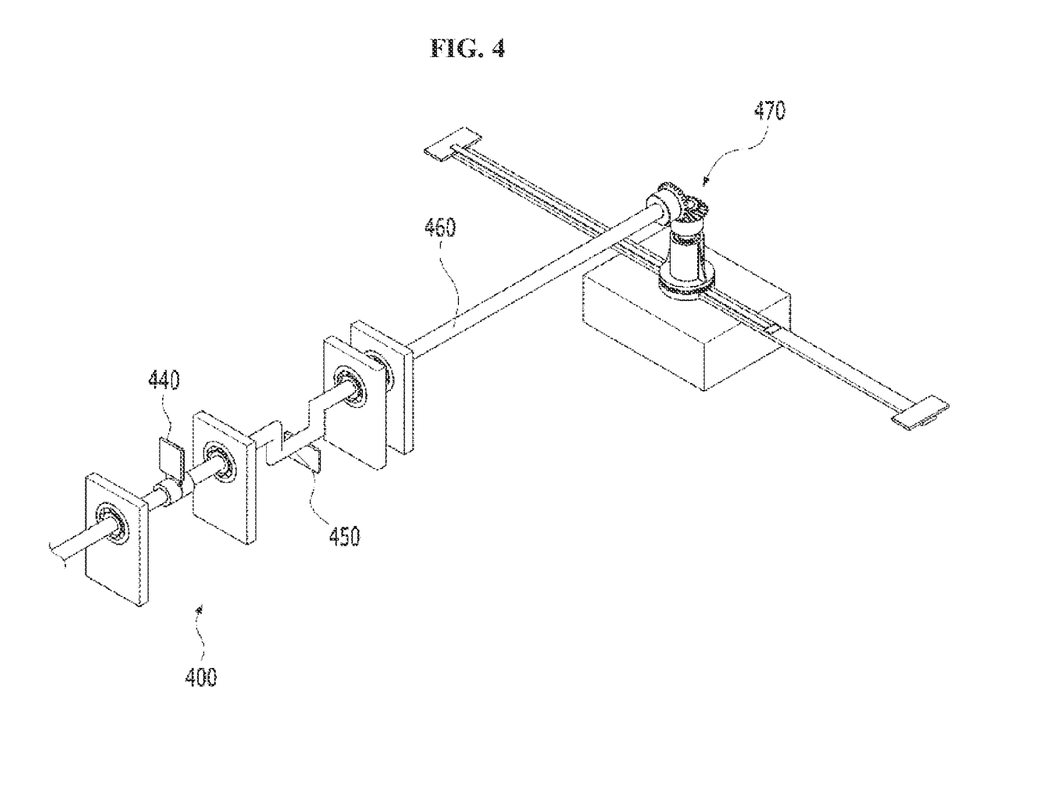
FIG. 4 is a perspective view illustrating a rotational force amplifier according to another embodiment of the present invention.

FIG. 4 is a perspective view illustrating a rotational force amplifier 1 according to another embodiment of the present invention.

The rotational force amplifier 1 according to an embodiment may include one or more eccentric amplification units 2 each having a first rotation unit in which a shaft disposed in the power transmission shaft direction is connected to a central portion thereof and which is eccentrically connected to a shaft, which is disposed in the driven shaft, in the driven shaft direction and a horizontal rotating device 470 connected to the eccentric amplification unit through a shaft.

Specifically, the rotational force amplifier 1 may include the horizontal rotating device 470 having a helical gear. When the horizontal rotating device 470 is present at a final output terminal, the horizontal rotating device 470 may transmit a rotational force, by which rotation is performed about a shaft 460 extending from a power transmission shaft, to the outside so that rotation is performed parallel to a ground surface.

Referring to FIG. 4, when the shaft 460 extending from the power transmission shaft rotates, the rotational force is transmitted through the horizontal rotating device 470 so that a wing of the horizontal rotating device 470 is rotated parallel to the ground surface. The horizontal rotating device 470 will be described in more detail with reference to FIG. 5.

Figure 5:
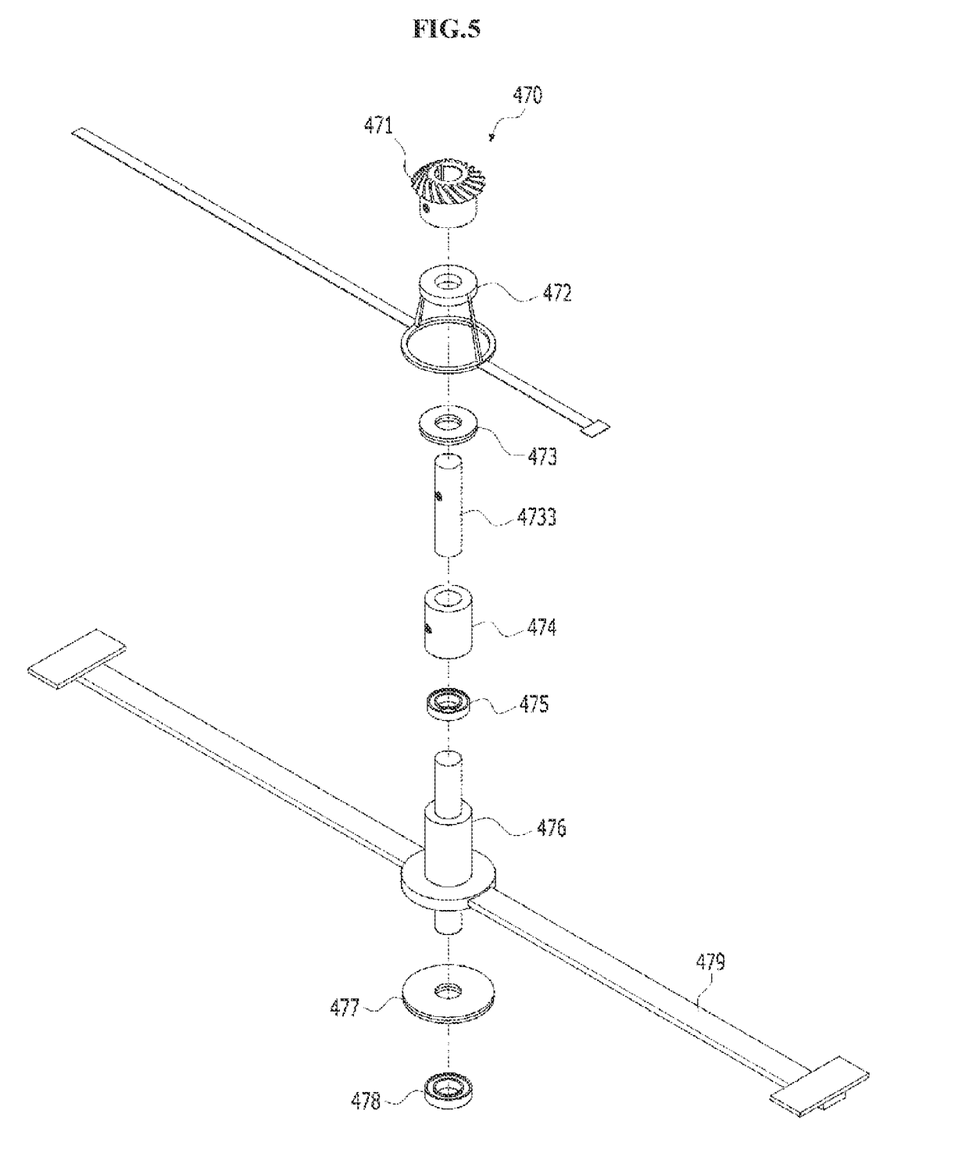
FIG. 5 is an enlarged side view illustrating a main part of the rotational force amplifier illustrated in FIG. 4.

FIG. 5 is a detailed perspective view illustrating a structure of the horizontal rotating device 470 illustrated in FIG. 4.

The horizontal rotating device 470 according to an embodiment includes a helical gear unit 471 coupled to an outer side of a shaft connected to the eccentric amplification unit to be rotatable in conjunction with the shaft, a horizontal resistance connecting part 472 connected to the helical gear unit 471 to be rotated along with the helical gear unit 471, a thrust bearing 473 positioned between the horizontal resistance connecting part 472 and a socket 474, a horizontal resistance connecting shaft 4733 which is positioned inside the horizontal resistance connecting part 472, is connected to the helical gear unit 471, and is a rotating shaft of the horizontal resistance connecting part 472, a horizontal rotation unit 479 connected to the horizontal resistance connecting part 472 at one side of a wing, and a bearing 475 and the socket 474 positioned outside the horizontal rotation unit.

Referring to FIG. 5, when a rotational force transmitted from a power driving shaft rotates the helical gear unit 471, the rotational force is transmitted to the horizontal resistance connecting part 472, the horizontal resistance connecting part 472 is rotated, and the rotational force is transmitted to one of two wings of the horizontal rotation unit 479 so that the horizontal rotation unit 479 is rotated. That is, a long one of the wings of the horizontal resistance connecting part 472 is connected to one of the wings of the horizontal rotation unit 479, and the rotational force of the horizontal resistance connecting part 472 is transmitted to only one of the wings of the horizontal rotation unit 479. That is, a force transmitted through the helical gear unit 471 is transmitted to one wing of two wings of the horizontal rotation unit 479 through the horizontal resistance connecting part 472.

In this case, as two wings of the horizontal rotation unit 479 become longer and heavier, a rotational force may be greatly amplified and transmitted to the outside.

Figure 6:
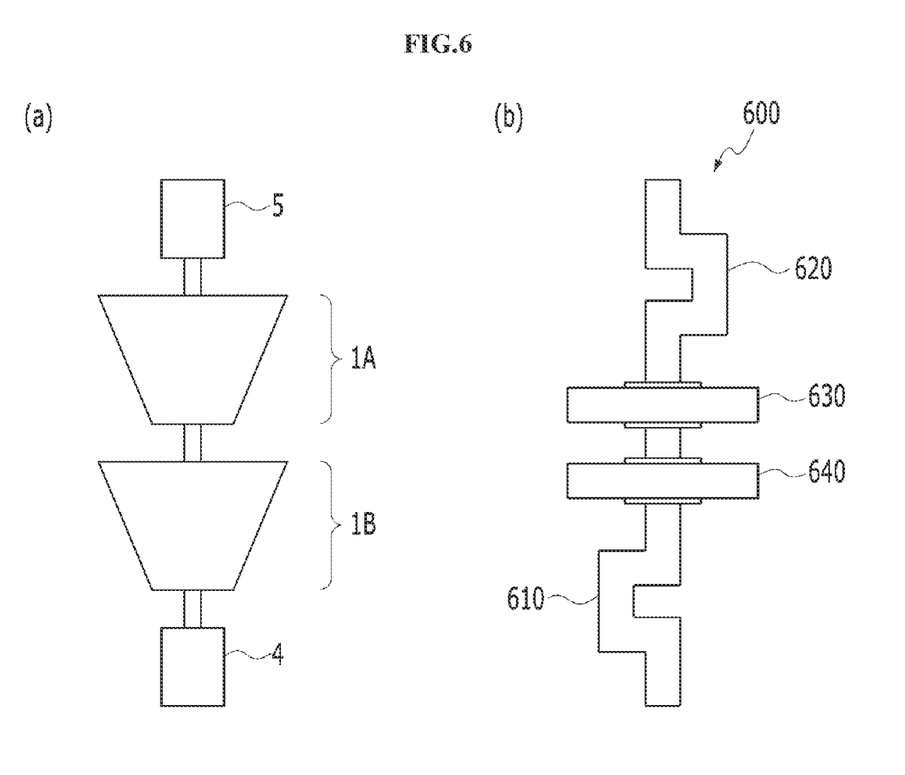
FIG. 6 is a conceptual view illustrating a case in which a plurality of rotational force amplifiers according to an embodiment of the present invention are connected.

(a) of FIG. 6 is a conceptual view illustrating a state in which two rotational force amplifiers 1 according to an embodiment are connected in series, and (b) of FIG. 6 is a conceptual illustrating a connecting device 600 positioned between two rotational force amplifiers.

According to an embodiment, the same two rotational force amplifiers 1 may be connected in series. Referring to (a) of FIG. 6, a second rotational force amplifier 1A is connected to a rear end of a first rotational force amplifier 1B connected to a driving motor 4, and the second rotational force amplifier 1A is connected to an output terminal 5.

In this case, a rotational force transmitted from the driving motor may be amplified by the first rotational force amplifier 1B by two times, transmitted to the second rotational force amplifier 1A, and amplified by the second rotational force amplifier 1A by two times using only half of the received rotational force, and the amplified rotational force may be transmitted to the output terminal 5.

When configured as described above, since a small load is applied to the driving motor 4, an amplified rotational driving force may be transmitted to the outside without overheating the driving motor 4.

Referring to (b) of FIG. 6, the connecting device 600 disposed between and connected to two rotational force amplifiers is illustrated. That is, (b) of FIG. 6 is a view illustrating the connecting device 600 positioned between the first rotational force amplifier 1B and the second rotational force amplifier 1A illustrated in (a) of FIG. 6.

Specifically, the connecting device 600 may be used between two rotational force amplifiers in order to connect two rotational force amplifiers.

The connecting device 600 according to an embodiment may include a rotating shaft which concentrically rotates with the driving motor 4 and the output terminal 5, a first resistance shaft 610 eccentrically formed along the rotating shaft to be bent from the rotating shaft, a first bearing 630 and a second bearing 640 which are concentrically formed around the rotating shaft, and a second resistance shaft 620 eccentrically formed along the rotating shaft to be bent from the rotating shaft in a direction opposite to that of the first resistance shaft 610.

The connecting device 600 according to an embodiment may include the first resistance shaft 610 formed along the rotating shaft to be bent in a "c" shape in one direction and the second resistance shaft 620 formed to be bent in a "c" shape in another direction. In this case, two bearings 630 and 640 may be positioned between the first resistance shaft 610 and the second resistance shaft 620 in order to support the first resistance shaft 610 and the second resistance shaft 620.

In addition, the connecting device 600 may also be additionally connected to an output terminal 5 of two serial rotational force amplifiers 1. Due to the added connecting device, even when a load applied to a rear end of the connecting device is equal to or smaller than a force applied to the output terminal 5 of two serial rotational force amplifiers, the output terminal 5 may be rotated without excessively driving the driving motor 4.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims and encompasses all modifications or alterations derived from meanings, the scope, and equivalents of the appended claims.

What is claimed is:

1. A rotational force amplifier which amplifies a rotational force of a power transmission shaft and transmits the amplified rotational force to a driven shaft, the rotational force amplifier comprising:
   one or more eccentric amplification units each having a first rotation unit in which a first rotating shaft disposed in a power transmission shaft direction is connected to a central portion of the first rotation unit and which is connected to a second rotating shaft disposed toward the driven shaft in a driven shaft direction; and
   an output terminal amplification unit which includes a second rotation unit connected to the one or more eccentric amplification units through the second rotating shaft in the power transmission shaft direction and rotated at an outer side of the second rotating shaft, transmits a rotational force, which is transmitted from the one or more eccentric amplification units, of the second rotating shaft to one wing among two wings of the second rotation unit through a resistance connecting part, and drives the second rotation unit to transmit the amplified rotational force of the second rotation unit in the driven shaft direction.

2. The rotational force amplifier of claim 1, wherein the one or more eccentric amplification units include:
   the first rotation unit in which the first rotating shaft disposed in the power transmission shaft direction is connected to the central portion of the first rotation unit;
   an eccentric shaft which has an "L" shape, is eccentrically coupled to the first rotation unit at a position away from a center by a predetermined distance in a fitting manner, and is coupled to one wing among two wings of the first rotation unit to transmit a rotational force of the firstrotation unit in the driven shaft direction;
   a wing pendulum which is connected to a wing opposite to the one wing of the first rotation unit and balances weights of both sides of the first rotation unit; and
   a self-aligning ball bearing connected to the eccentric shaft in the power transmission shaft direction and connected in the driven shaft direction through the second rotating shaft.

3. The rotational force amplifier of claim 2, wherein, when the number of the one or more eccentric amplification units is two or more, a direction, in which the eccentric shaft of at least one of the two or more eccentric amplification units is eccentric, is opposite to a direction in which the eccentric shaft of the remaining eccentric amplification unit is eccentric.

4. The rotational force amplifier of claim 1, wherein the output terminal amplification unit further includes:
   the second rotating shaft disposed in the power transmission shaft direction;
   the resistance connecting part which is coupled to the second rotating shaft and receives the rotational force;
   the second rotation unit of which the one wing of the two wings is coupled to the resistance connecting part;
   an output terminal wing pendulum formed on the remaining wing that is different from the one wing of the second rotation unit;
   a resistance shaft formed along the second rotating shaft to be bent in a "□" shape in a direction opposite to a direction of the one wing; and
   a weight pendulum formed on the second rotating shaft in a direction opposite to a direction in which the resistance shaft is bent.

5. A rotational force amplification system which amplifies a rotational force supplied by a driving motor and outputs the amplified rotational force to an output terminal using the rotational force amplifier of claim 1, wherein:
   the rotational force amplifier is sequentially provided as a plurality of rotational force amplifiers;
   the rotational force amplification system further comprises a connecting device which is interposed between the plurality of rotational force amplifiers and transmits a rotational force amplified by a foremost rotational force amplifier to a rearmost rotational force amplifier; and
   the connecting device includes a rotating shaft which concentrically rotates with the driving motor and the output terminal, a first resistance shaft which is eccentrically formed on a front end of the rotating shaft to be bent from the rotating shaft, a first bearing and a second bearing concentrically formed around the rotating shaft, and a second resistance shaft eccentrically formed on a rear end of the rotating shaft to be bent from the rotating shaft in a direction opposite to that of the first resistance shaft.

6. The rotational force amplification system of claim 5, further comprising a connecting device which is positioned on a rear end of the rearmost rotational force amplifier and transmits a rotational force amplified by the rearmost rotational force amplifier to the output terminal.

7. A rotational force amplifier which amplifies a rotational force of a power transmission shaft and transmits the amplified rotational force to a driven shaft, the rotational force amplifier comprising:
   one or more eccentric amplification units each having a first rotation unit in which a first rotating shaft disposed in a power transmission shaft direction is connected to a central portion of the first rotation unit and which is connected to a second rotating shaft disposed toward the driven shaft in a driven shaft direction; and
   a horizontal rotating device which is connected to the one or more eccentric amplification units through the second rotating shaft, rotates two wings in a horizontal direction using a rotational force transmitted through the second rotating shaft to amplify the rotational force parallel to a ground surface, and transmits the amplified rotational force to an output terminal.

8. The rotational force amplifier of claim 7, wherein the horizontal rotating device includes:
   a helical gear unit connected to the one or more eccentric amplification units through the second rotating shaft and coupled to an outer side of the second rotating shaft to be rotated in conjunction with the second rotating shaft;
   a horizontal resistance connecting part which is coupled to the helical gear unit through a shaft and receives a rotational force of the helical gear unit to be rotated; and
   a horizontal rotation unit including two wings which have one wing coupled to the horizontal resistance connecting part and are rotated according to rotation of the horizontal resistance connecting part.

* * * * *